(12) United States Patent
Dallal et al.

(10) Patent No.: US 11,606,131 B2
(45) Date of Patent: Mar. 14, 2023

(54) LENS ANTENNA ARRAY WITH BEAM INDEX MODULATION

(71) Applicant: QUALCOMM Incorporated, San Diego, CA (US)

(72) Inventors: Yehonatan Dallal, Kfar Saba (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/376,819

(22) Filed: Jul. 15, 2021

(65) Prior Publication Data

US 2022/0029312 A1    Jan. 27, 2022

Related U.S. Application Data

(60) Provisional application No. 63/056,331, filed on Jul. 24, 2020.

(51) Int. Cl.
H04B 7/06    (2006.01)

(52) U.S. Cl.
CPC ......... H04B 7/0691 (2013.01); H04B 7/0608 (2013.01); H04B 7/0617 (2013.01)

(58) Field of Classification Search
CPC ... H04B 7/0691; H04B 7/0608; H04B 7/0617
See application file for complete search history.

(56) References Cited

U.S. PATENT DOCUMENTS

| | | | |
|---|---|---|---|
| 10,714,836 B1* | 7/2020 | Karabacak | H04B 7/0868 |
| 2018/0269576 A1* | 9/2018 | Scarborough | H01Q 3/46 |
| 2018/0302802 A1* | 10/2018 | Fanfelle | H04W 16/28 |
| 2019/0173500 A1* | 6/2019 | Artemenko | H01Q 1/247 |
| 2020/0243981 A1* | 7/2020 | Karabacak | H04B 7/0617 |
| 2021/0036753 A1* | 2/2021 | Lee | H01Q 21/28 |

* cited by examiner

*Primary Examiner* — Kenneth T Lam
(74) *Attorney, Agent, or Firm* — Haynes and Boone, LLP

(57) ABSTRACT

A lens antenna array system is provided that includes a plurality of communication links. The lens antenna array system uses beam index modulation to select an active subset of communication links from the plurality of communication links. The selection of the active subset of the communication links constitutes the transmission of a digital word.

20 Claims, 11 Drawing Sheets

Symbol 2

Symbol 1

LENS ANTENNA ARRAY WITH BEAM INDEX MODULATION

CROSS REFERENCE TO RELATED APPLICATION

The present application claims priority to U.S. Provisional Patent Application No. 63/056,331, filed Jul. 24, 2020, which is hereby incorporated by reference in its entirety.

TECHNICAL FIELD

The technology discussed below relates generally to wireless communication systems, and more particularly, to lens antenna array systems with beam index modulation.

BACKGROUND

To meet the growing demands for expanded mobile broadband connectivity, wireless communication technologies advanced from the long-term evolution (LTE) technology to a next generation new radio (NR) technology, which may also be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. Despite this wide array of spectrum bands, the supported data rates may not be sufficient for very-high-data-rate communication.

To provide increased bandwidth to support higher data rates, 5G and future standards such as the $6^{th}$ generation (6G) propose the use of sub-Terahertz (e.g., 100 GHz to 300 GHz) carrier frequencies. At these higher frequencies, the radio frequency (RF) signal begin to propagate similarly to visible light. Given this similarity to light propagation, various systems have been proposed in which an antenna array is combined with an electromagnetic (EM) lens to form a lens antenna array.

SUMMARY

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with an aspect of the disclosure, a method of wireless communication for a lens antenna array system is provided that includes: selecting a first subset of transmit antennas from an array of transmit antennas arranged in a focal region of a first lens; transmitting from each transmit antenna in the first subset of transmit antennas to form a plurality of first RF signals that are directed through the first lens toward a second lens for a first symbol interval; selecting a second subset of transmit antennas from the array of transmit antennas; and transmitting from each transmit antenna in the second subset of the transmit antennas to form a plurality of second RF signals that are directed through the first lens towards the second lens for a second symbol interval In accordance with another aspect of the disclosure, a method of wireless communication is provided that includes: transmitting a first plurality of RF signals over a first symbol interval from a first subset of transmit antennas in an array of transmit antennas arranged in a focal region of a first lens in a lens antenna array system that includes an array of receive antennas arranged in a focal region of a second lens such that an RF transmission from each transmit antenna maps to a corresponding receive antenna, wherein each transmit antenna not included within the first subset of transmit antennas is unused during the first symbol interval; and receiving the first plurality of RF signals at a first subset of receive antennas in the array of receive antennas to receive a first symbol.

In accordance with yet another aspect of the disclosure, a system for wireless communication is provided that includes: a first lens; a plurality of transmit antennas arranged in a focal region of the first lens; a plurality of on-off keying modulators corresponding to the plurality of transmit antennas, each on-off keying modulator and corresponding transmit antenna forming a transmit link; and a processor configured to map a first digital word into a selection of a first subset of the transmit links such that each transmit link in the first subset of the transmit links transmits an RF signal and such that each transmit link that is not in the first subset of the transmit links does not transmit an RF signal.

Finally, in accordance with another aspect of the disclosure, a system for wireless communication is provided that includes: a first lens; a plurality of receive antennas arranged in a focal region of the first lens; a plurality of low-noise amplifiers corresponding to the plurality of receive antennas; a plurality of envelope detectors corresponding to the plurality of receive antennas, each receive antenna and corresponding low-noise amplifier and corresponding envelope detector forming a corresponding receive link; and a processor configured to map a selection of a first subset of the receive links into a first digital word based upon which receive link receives a first RF signal.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1A:
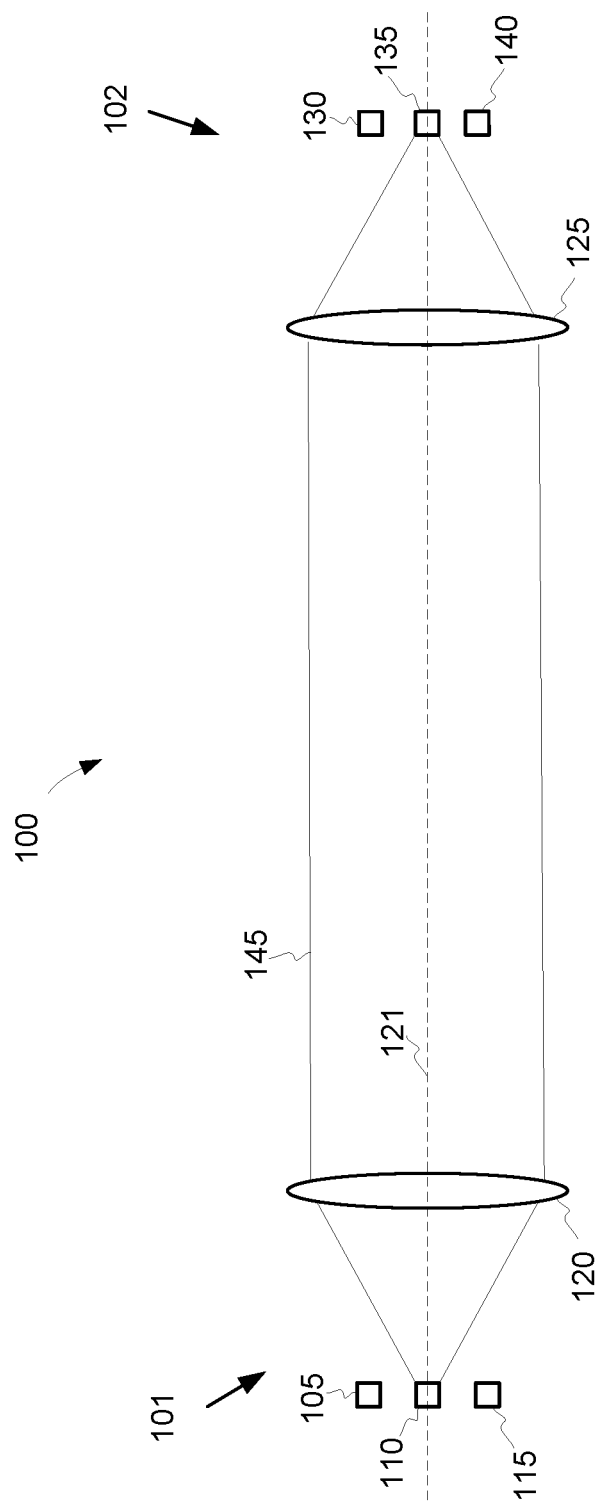
FIG. 1A illustrates a lens antenna array system in which a central transmit antenna transmits a beam to a central receive antenna in accordance with an aspect of the disclosure.

Data flow in static scenarios such as in data centers tends to be very bursty. It is thus typical that a relatively large percentage of the total data flow occurs over a relatively small percentage of the operating time for a computer network data flow. To accommodate such "elephant flows" of data, it is conventional to use an optical fiber link. Data as represented by electronic signals is converted into optical signals that propagate across the fiber from a transmitter to be converted back into electronic form at a receiver. But once installed, an optical link requires a fixed topology. As an alternative, free-space optics may be used such as through the use of micro-electro-mechanical mirrors. But such systems are expensive and difficult to maintain.

To provide an alternative to optical links, a lens antenna array system is disclosed that is readily reconfigured so that a transmitter and a receiver may be re-positioned yet offers the bandwidth to accommodate relatively-large data rates (e.g., 25 to 100 Gbps). The system includes both simplex and duplex embodiments with regard to communication between two lens antenna array endpoints. In a simplex mode of operation, one of the endpoints is a lens antenna array transmitter whereas a second one of the endpoints is a lens antenna array receiver. In a duplex embodiment, both endpoints function as a lens antenna array transmitter and as a lens antenna array receiver. The following discussion will be directed to a simplex embodiment without loss of generality such that there is a dedicated lens antenna array transmitter endpoint and a dedicated lens antenna array receiver endpoint. But since the topology of the endpoints may be the same, the roles of such fixed endpoints are readily reversed such that what is described as a transmitter may instead function as a receiver. Similarly, what is described as a receiver may instead function as a transmitter.

The lens antenna array transmitter includes an array of transmit antennas arranged in a focal region of a first lens. The lens antenna array receiver also includes an array of receive antennas arranged in a focal region of a second lens. To obtain the desired high data rates, the data being transmitted by the lens antenna array transmitter may be divided into multiple streams. In such embodiments, each data stream corresponds to a single transmit antenna (or to a single corresponding sub-array of transmit antennas) in the array of transmit antennas. More generally, a unique mapping is provided from a transmitting sub-array of antennas to a corresponding receiving sub-array of antennas. The following discussion will assume that each sub-array of antennas is formed by just one antenna without loss of generality. The array of transmit antennas are distributed across the focal region of the first lens such that the transmitted data stream from each transmit antenna is collimated by the first lens to be transmitted in a corresponding angle of departure from the first lens. The positioning of each transmit antenna in the focal region of the first lens maps into a corresponding AoD-dependent focusing of the RF signal from the first lens. The second lens provides a corresponding angle-of-arrival-dependent focusing of the received RF signals onto the corresponding ones of the receive antennas.

The angle of departure may be defined with regard to a central axis of the first lens. About this central axis, the first lens extends in both an azimuth direction and an elevation direction. Similarly, the array of transmit antennas may be arranged in both the azimuth and elevation directions about a central axis in the focal region of the first lens. An example lens antenna array system 100 is shown in FIG. 1A. A lens antenna array transmitter 101 includes a first lens 120. Some example transmit antennas in the array of transmit antennas include an upper transmit antenna 105, a central transmit antenna 110, and a lower transmit antenna 115. The transmit antennas are arranged in the focal region of the first lens 120. As used herein, the term "lens" may refer to a single lens or may instead denote a collection of multiple lenses.

The position of a transmit antenna in the focal region with respect to a central axis 121 of the first lens 120 determines a corresponding angle of departure for a transmitted data stream from the transmit antenna. For demonstration purposes, each transmit antenna has no azimuth displacement with respect to the central axis 121 although such azimuth displacement exists for other embodiments discussed herein. Upper transmit antenna 105 is displaced positively in the elevation direction from central axis 121. Central transmit antenna 110 has no elevation displacement with respect to central axis 121 so that central transmit antenna 110 is aligned with central axis 121. Lower transmit antenna 115 is displaced negatively in the elevation direction from central axis 121. For illustration purposes, only central transmit antenna 110 is active in FIG. 1A to produce a transmitted RF signal 145 from first lens 120. However, all the transmit antennas may be active in embodiments disclosed herein. Since central transmit antenna 110 is aligned with central axis 121, transmitted RF signal 145 has a zero angle-of-departure in both the azimuth and elevation directions.

Figure 1B:
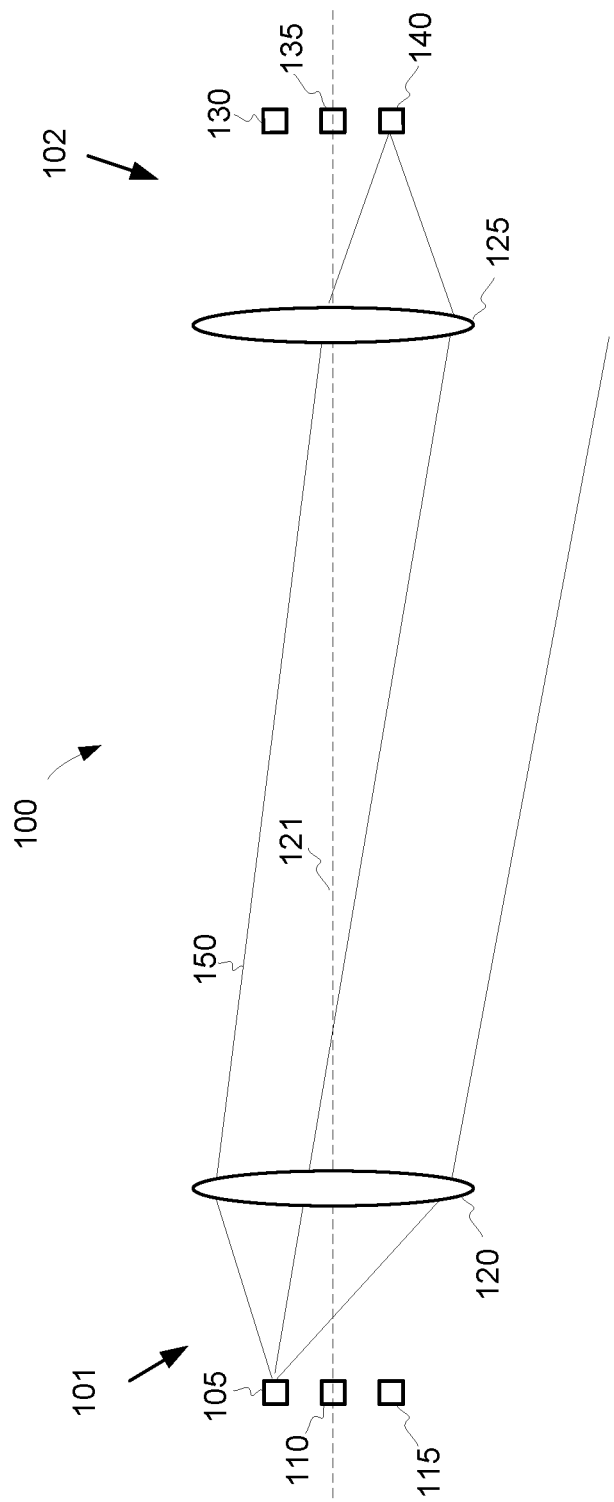
FIG. 1B illustrates a lens antenna array system in which an upper transmit antenna transmits a beam to a lower receive antenna in accordance with an aspect of the disclosure.

Analogous to the single transmit antenna operation of FIG. 1A, it is only upper transmit antenna 105 that is active in FIG. 1B. Since upper transmit antenna 105 is displaced positively in elevation from central axis 121, a transmitted RF signal 150 from first lens 120 has a negative angle-of-departure in elevation due to the refraction through first lens 120. Transmitted RF signal 150 has a zero angle-of-departure in azimuth since upper transmit antenna 105 has no azimuth displacement from central axis 121. As discussed with regard to FIG. 1A, all the transmit antennas may be active simultaneously but it is just upper transmit antenna 105 that is active in FIG. 1B for illustration purposes.

Figure 1C:
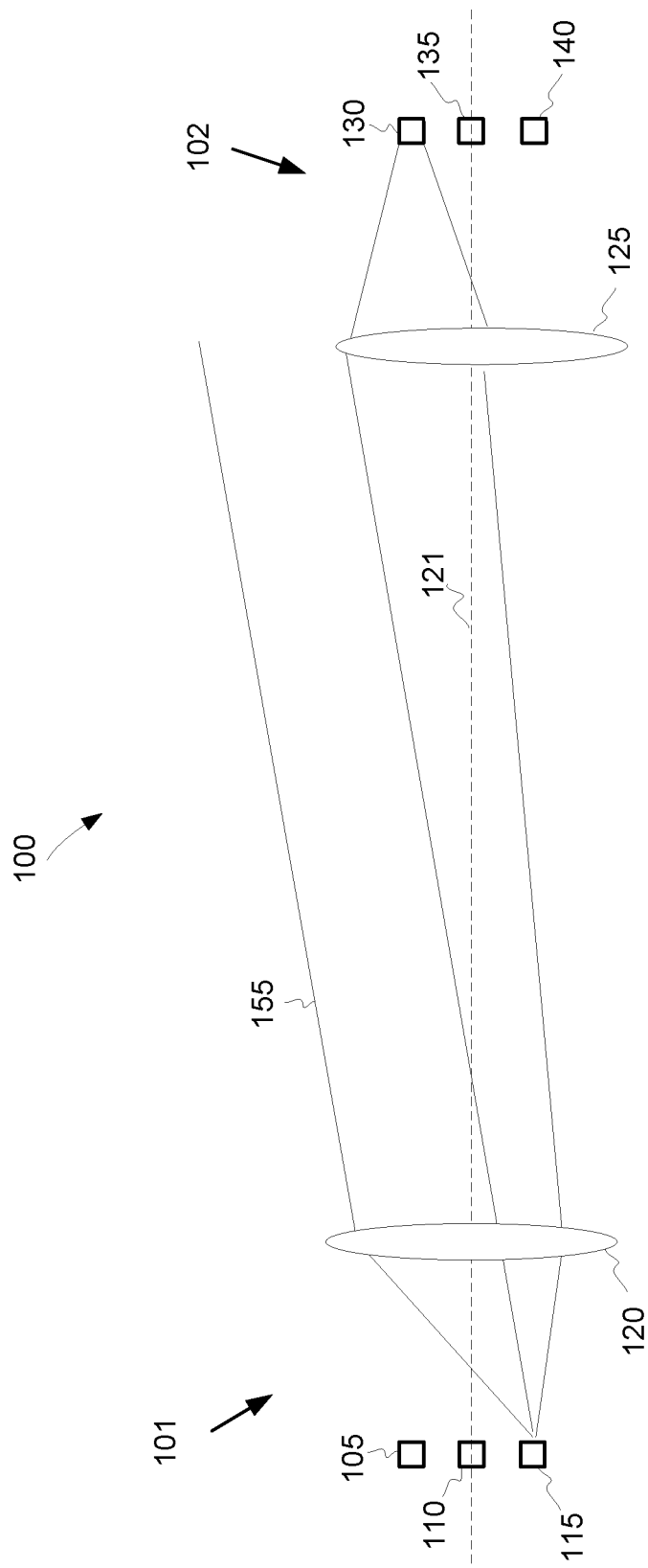
FIG. 1C illustrates a lens antenna array system in which a lower transmit antenna transmits a beam to an upper receive antenna in accordance with an aspect of the disclosure.

In FIG. 1C, it is lower transmit antenna 115 that is active. Since lower transmit antenna 115 is displaced in the negative elevation direction from central axis 121, a transmitted RF signal 155 from first lens 120 has a positive angle-of-departure in the elevation direction with regard to central axis 121. More generally, the displacement from central axis 121 by a transmit antenna in azimuth and/or elevation translates into an angle-of-departure having the opposite signs in the azimuth and/or elevation angles. Should a transmit antenna be displaced in the focal region from central axis 121 by a positive azimuth direction, the corresponding angle-of-departure from first lens 120 will be in the negative azimuth direction. Conversely, should a transmit antenna be displaced in the negative azimuth direction from central axis 121, the corresponding angle-of-departure from first lens 120 will be in the positive azimuth direction.

As shown in FIGS. 1A-1C, a lens antenna array receiver 102 includes a second lens 125 that may have the same dimensions and construction as used for the first lens 120. Second lens 125 is aligned with the first lens 120 such that the central axis 121 is also the central axis 121 for lens 125. An array of receive antennas is aligned along a focal region of the second lens 125. Some example receive antennas include an upper receive antenna 130, a central receive antenna 135, and a lower receive antenna 140.

The position of each receive antenna in the focal region with respect to the central axis 121 of second lens 125 determines a corresponding angle-of-arrival for a transmitted RF signal data stream from lens antenna array transmitter 101 that will be focused or concentrated on the receive antenna. For demonstration purposes, each receive antenna has no azimuth displacement with respect to the central axis 121 although such azimuth displacement exists for other embodiments discussed herein. Upper receive antenna 130 is displaced positively in the elevation direction from central axis 121. Central receive antenna 135 has no elevation displacement with respect to central axis 121 so that central receive antenna 135 is aligned with central axis 121. Lower receive antenna 140 is displaced negatively in the elevation direction from central axis 121.

In some embodiments, the receive antennas are arranged symmetrically with the transmit antennas. Upper receive antenna 130 thus has the same positive elevation displacement from central axis 121 as upper transmit antenna 105. Similarly, lower receive antenna 140 may have the same negative displacement in elevation as lower transmit antenna 115. Central receive antenna 135 is similarly symmetrically positioned with no azimuth or elevation displacement for central axis 121 as discussed for central transmit antenna 110. This symmetry between first lens 120, second lens 125 and the positioning of the receive and transmit antennas results in a one-to-one mapping between each transmit antenna and a corresponding receive antenna that will receive the greatest RF signal energy from the corresponding transmit antenna. For example, as shown in FIG. 1A, transmitted RF signal 145 from central transmit antenna 110 is received most strongly at central receive antenna 135. Transmitted RF signal 150 from upper transmit antenna 105 is received most strongly at lower receive antenna 140 as shown in FIG. 1B. Similarly, transmitted RF signal 155 from lower transmit antenna 115 is received most strongly at upper receive antenna 130 as shown in FIG. 1C.

In general, receiving lens 125 provides an angle-of-arrival-dependent (AoA-dependent) focusing of a received RF signal that focuses the resulting RF energy onto a receiving antenna (or sub-array of antennas) in the array of receiving antennas. If lenses 120 and 125 are identical (or substantially identical) and the transmit antennas and the receive antennas have the same positioning in their corresponding focal region, a one-to-one mapping occurs between each transmit antenna a corresponding receive antenna with regard to the strongest receipt of the transmitted RF signal from the transmit antenna (assuming that the distance between the receive and transmit lenses may be considered small with respect to $D^2/\lambda$, where D is the lens diameter and $\lambda$ is the wavelength). More generally, a one-to-one mapping may occur between a sub-array of transmit antennas and a sub-array of the receive antennas.

Figure 2:
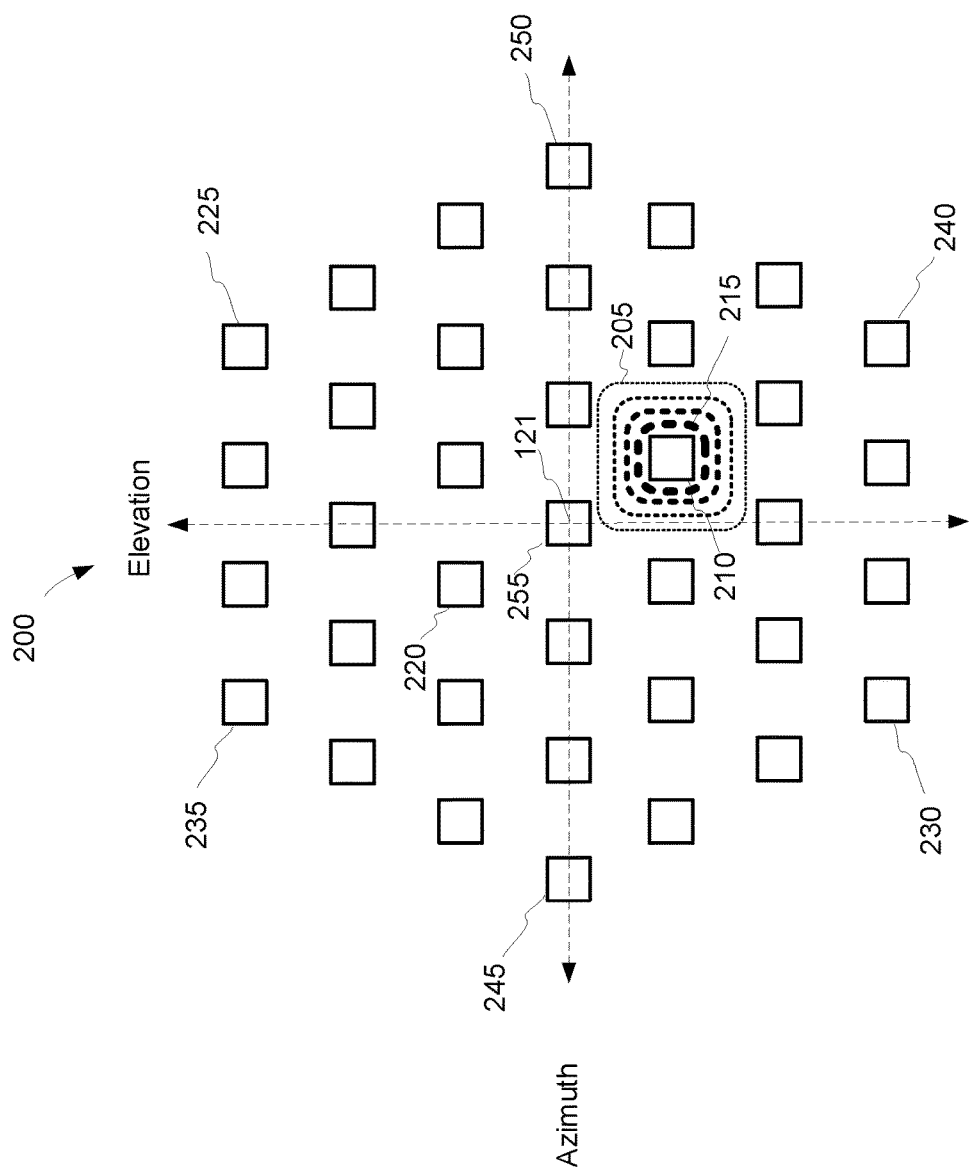
FIG. 2 illustrates a received power profile for a receive antenna in an array of receive antennas for a lens antenna array system in accordance with an aspect of the disclosure.

A one-to-one mapping may be better appreciated with reference to FIG. 2, which illustrates the positioning of an array 200 of antennas in the elevation and azimuth directions from central axis 121. In a symmetric embodiment, the array of transmit antennas has the same positioning in the elevation and azimuth directions as the array of receive antennas. In such an embodiment, it is thus arbitrary to denote array 200 as an array of receive antennas or as an array of transmit antennas since the identical positioning is used for both arrays. Given this symmetry, the position of a transmit antenna having a displacement in elevation and azimuth from central axis 121 maps into a receiving antenna with the opposite displacement in both azimuth and elevation. For example, suppose a transmit antenna 220 has a negative displacement in azimuth and a positive displacement in elevation from central axis 121. A received RF signal from such a transmit antenna is thus focused onto a receive antenna 210 with the opposite but same magnitude of azimuth and elevation displacements from central axis 121. The power of the received RF signal is strongest at receive antenna 210 and drops off with respect with to a displacement from a center of receive antenna 210. For example, the received signal power on a curve 205 that is relatively displaced from the center of receive antenna 210 is relatively weak compared to the received signal power on a curve 215 that is closer to the center of receive antenna. A similar one-to-one mapping exists between a transmit antenna 235 to a receive antenna 240. Each antenna has a mirror image antenna about central axis 121. Given this mirror image, a positive elevation displacement becomes a negative elevation displacement of the same magnitude. Conversely, a negative elevation displacement becomes a positive elevation displacement of the same magnitude. Similarly, a positive azimuth displacement becomes a negative azimuth displacement whereas a negative azimuth displacement becomes a positive azimuth displacement of the same magnitude. For example, a transmit antenna 225 maps to a receive antenna 230. Similarly, a transmit antenna 245 maps to a receive antenna 250.

Given this one-to-one antenna mapping, an array of N transmit antennas can uniquely transmit N RF signals to N corresponding receive antennas, N being a positive integer. More generally, the mapping may be from one sub-array of transmit antennas to a corresponding sub-array of receive antennas.

Referring again to FIGS. 1A-1C, the received signal power is one limiting factor in increasing the data rate despite the advantage of supporting N separate RF signals. To significantly improve the received signal power, the separation between first lens 120 and second lens 125 is such that the RF signal propagation between the two lenses occurs in the near-field regime. With regard to establishing near-field propagation, note that an antenna such as one of the receive antennas or of the transmit antennas will typically have a dimension on the order of a wavelength for the RF signal. For example, the receive and transmit antennas may be patch antennas or dipole antennas. The near-field propagation regime from such wavelength-sized antennas is several wavelengths. The wavelength of a 300 GHz RF signal is approximately 1 mm. If a wavelength-sized transmit antenna is separated by a corresponding wavelength-sized receive antenna by more than several millimeters, the resulting RF signal propagation occurs in the far-field regime. In contrast, the far-field for a lens antenna array is proportional to two times the square of the lens diameter divided by the wavelength. For example, suppose each lens has a diameter of 10 cm. The resulting far-field regime then doesn't start until the lenses are separated by 20 m for operation at 300 GHz. In general, the near-field separation between the lenses depends upon the lens diameter and the operating wavelength. Advantageously, an $R^2$ propagation loss (R being the separation between lenses) does not substantially occur until the separation R is large enough to invoke far-field regime propagation. With the separation R being less than this far-field threshold, the energy of the transmitted RF signal is effectively contained within a cylinder that extends from the perimeter of first lens 120 to a perimeter of second lens 125 as shown in FIGS. 1A, 1B, and 1C for RF transmitted signals 145, 150 and 155, respectively. The near-field propagation of the RF transmitted signals is thus effectively contained in a waveguide that extends from first lens 120 to second lens 125.

High data rates are achieved by splitting source data to be transmitted into multiple data streams that are transmitted in parallel. Upon recovery at the receiver, the multiple data streams may then be serialized to recover the source data. In a one-to-one embodiment, the number of data streams transmitted in parallel equals the number of the transmit antennas. The modulation and coding scheme (MCS) for each data stream will now be discussed. Note that a high-level MCS is affected by the relatively large phase noise (jitter) that exists for RF signaling at relatively-high frequencies such as in the sub-THz bandwidth from 100 to 300 GHz. The bandwidth for each data stream is also an issue. The bandwidth is a function of the data rate in each data stream. As the bandwidth (and hence the individual link data rate) increases, analog-to-digital conversion for each data link in lens antenna array receiver 102 becomes more problematic. In addition, the use of in-phase and quadrature-phase channels for each data link leads to increased power consumption. Furthermore, the use of frequency transform techniques such as a fast Fourier transform is also problematic as the data rate is increased. In light of these factors, a particularly advantageous MCS is the use of on-off keying. In on-off keying, an oscillating RF signal (for example, a sinusoid) is either transmitted (ON) or not transmitted (OFF) in sequential symbols. For example, in a first binary symbol the RF signal may be transmitted but in a subsequent second binary symbol no RF signal is transmitted. Depending upon the binary convention, the resulting digital word represented by the two symbols is either 10 or 01. Each additional binary symbol adds another bit to the transmitted signal.

Figure 3:
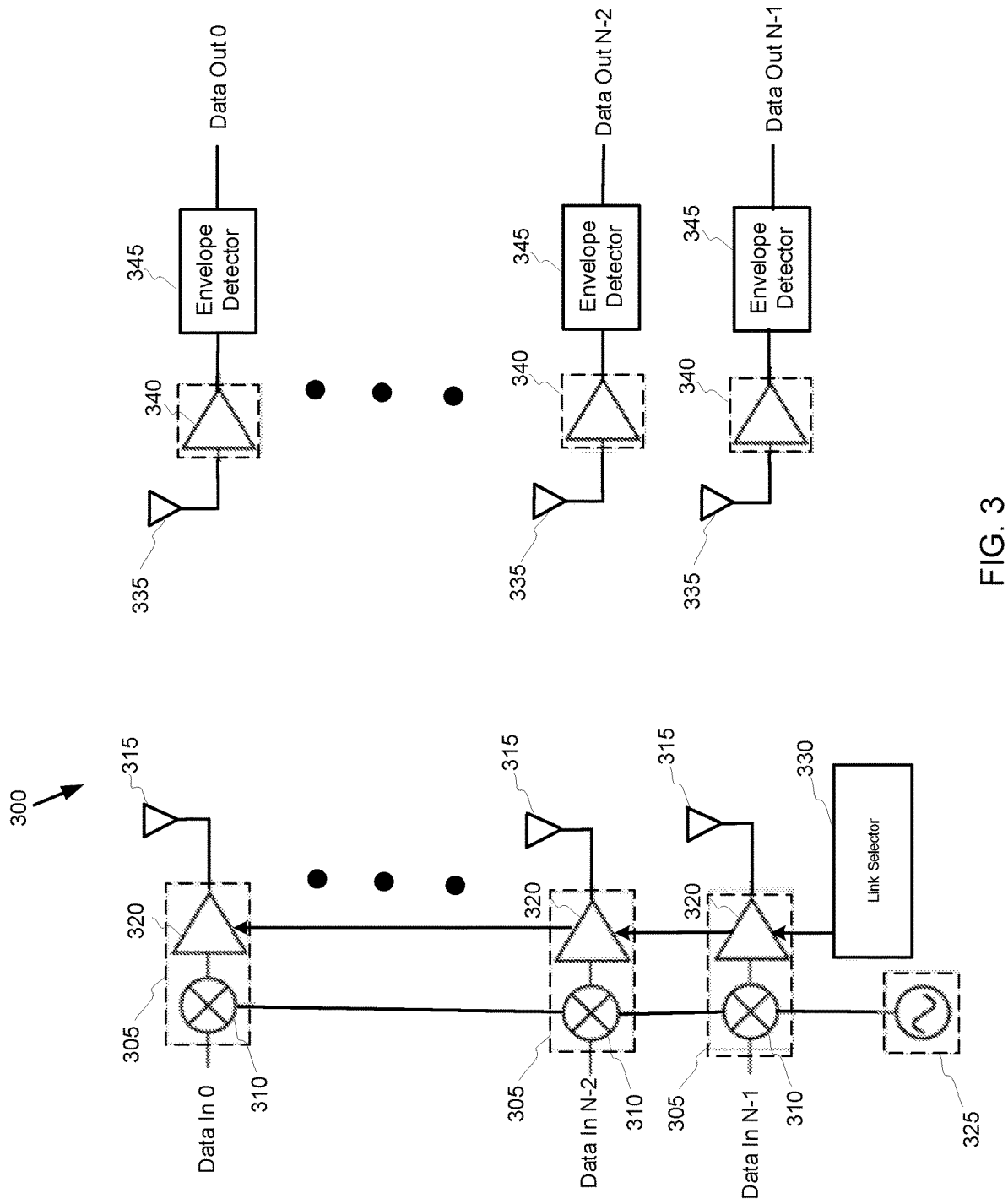
FIG. 3 illustrates a transmitter and receiver configuration for a lens antenna array system with on-off keying modulation in accordance with an aspect of the disclosure.

The length of each symbol may be varied in alternative embodiments but in one embodiment the symbol length may be 10 periods of the operating frequency. The symbol length will thus typically be shorter as the operating frequency is increased due to the resulting shorter period for the RF oscillation. An example lens antenna array 300 with on-off keying (OOK) modulation is shown in FIG. 3. There are N baseband input data streams ranging from a baseband input data stream 0 (Data In 0) to a baseband input data stream N−1 (Data In N−1). Each baseband input data stream drives a mixer 310 in a corresponding OOK modulator 305. An oscillator such as a voltage-controlled oscillator (VCO) 325 generates an RF signal at the desired carrier frequency for driving each mixer 310. Alternatively, each OOK modulator 305 (or subset of OOK modulators 305) may be driven by its own corresponding VCO. The OOK-modulated RF signal from each mixer 310 is amplified by a corresponding power amplifier 320. Each baseband input data stream drives its own communication link that includes OOK modulator 305 and transmit antenna 315. In some embodiments, only certain links are active whereas other are inactive. A link selector 330 controls whether each power amplifier 320 is powered depending upon whether the corresponding link is active or inactive. Each active power amplifier 320 drives a corresponding transmit antenna 315 (or sub-array of transmit antennas 315). Each data input stream is a binary data input stream consisting of binary zero's and binary ones. When a binary one drives a corresponding mixer 310, the on portion of the OOK modulation is produced whereas a binary zero produces the off portion of the OOK modulation. This convention may be reversed in alternative embodiments such that a binary zero produces the on portion whereas a binary one produces the off portion.

If lens antenna array system 300 has a one-to-one mapping between transmit antennas 315 and a corresponding set of receive antennas 335, each receive antenna 335 receives a corresponding OOK-modulated RF signal and drives a corresponding low-noise amplifier 340 accordingly. An envelope detector 345 is associated with each low-noise amplifier 340 to envelope detect the amplified OOK-modulated received RF signal to produce a baseband output data stream. Since there are N envelope detectors 345, there are N baseband output data streams ranging from a zeroth baseband output data stream (Data Out 0) to an (N−1)th baseband output data stream (Data Out N−1). The envelope detection is binary in that either an envelope is detected (the "on" of the OOK modulation) to produce a binary 1 output in the corresponding baseband output data stream or no signal (the "off" of the OOK modulation) is detected to produce a binary zero in the same baseband output data stream. Alternatively, an active-low convention may be used by each envelope detector 345 such that the detection of an envelope produces a binary zero and the detection of the lack of a signal produces a binary one.

Although the near-field RF propagation advantageously reduces the propagation loss, the one-to-one mapping from a transmit antenna to a receive antenna is not perfect such that some RF energy from the transmit antenna is received by other receive antennas besides the one targeted by the antenna mapping. The resulting interference at other receive antennas may be a limiting factor in increasing the overall data rate for the lens antenna array systems disclosed herein. The interference may be reduced by limiting the number of transmit antennas and receive antennas that are distributed across the focal region of their respective lenses. But reducing the number of antennas then reduces the number of independent data streams that can be transmitted.

Figure 4:
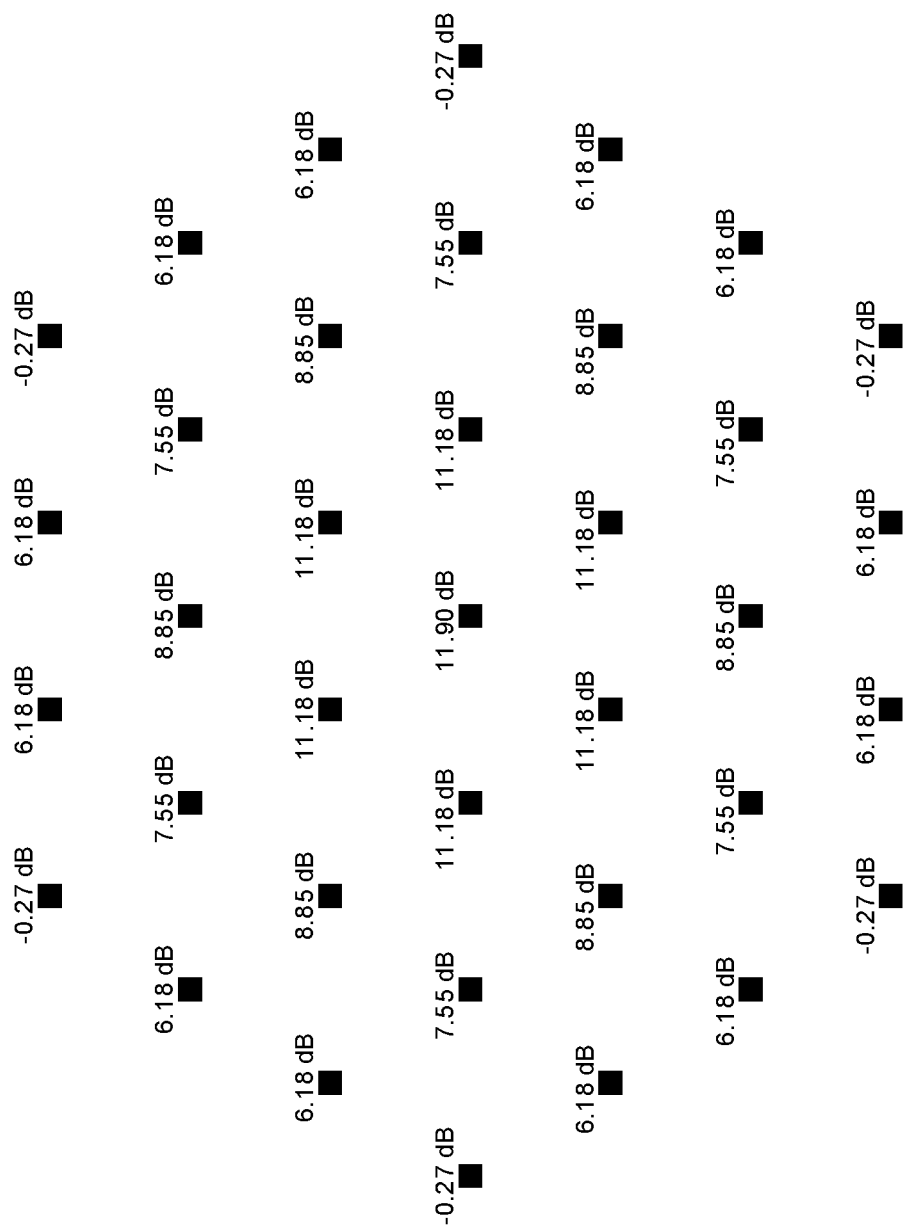
FIG. 4 illustrates the transmit/receive antenna positions for a plurality of active links and their SIR in which each active link uses a default gain in accordance with an aspect of the disclosure.

With regard to the number of antennas, array 200 of FIG. 2 has 37 antennas (N=37). In an embodiment with symmetric transmit and receive antenna positioning, it is arbitrary to denote array 200 as either a receive or a transmit array. The following discussion will consider array 200 as representing both arrays. Each antenna may be positioned in increments of azimuth and elevation displacement as measured in some multiple of the wavelength. In one embodiment, this inter-element spacing may be 1.8 times the wavelength but this may be varied in alternative embodiments. If each lens diameter is 150 mm, the focal length is 151 mm, the inter-element spacing is 1.8* and the range separation R is 3 meters for a lens antenna array system having transmit and receive arrays arranged as discussed for array 200 with an operating frequency of 300 GHz, the signal-to-interference ratio (SIR) at each receive antenna will depend upon the gain for each power amplifier 320. For example, if the gain is equal to a default level for each power amplifier 320 and the operating parameters are as just discussed, it may be shown that the SIR will vary widely at each receive antenna as shown in FIG. 4. In particular, a communication link using a central-most antenna 255 will receive its corresponding RF signal with the highest SIR (e.g, in excess of 11 dB). Other communication links with centrally-located antennas such as antenna 255 may receive RF signals with similarly-high SIRs. Conversely, the received RF signals for antennas 235, 225, 245, 250, 230, and 240 at the outskirts of array 200 have much lower SIRs (e.g. approximately −0.3 dB). The one-to-one links with a high SIR (e.g, greater than 10 dB) could employ a higher order modulation and coding scheme (MCS) than OOK such as quadrature phase-shift keying. But such relatively high-order MCS cannot be employed for the links with relatively-low SIR. In addition, the use of higher-order MCS complicates the design. To achieve a suitable SIR for each antenna using a lower-order MCS such as OOK, link selector 330 may deactivate some of the links to reduce the interference.

If the number of active links is reduced by a factor of 2 or more, it is beneficial to treat the active links as a single communication channel. For example, consider an embodiment using OOK modulation. If all of the possible N links are active, on average half of the links will be on and half will be off for any given symbol transmission. But this same state is achieved if a single symbol is transmitted by the selection of one-half of the N possible links such that the N/2 selected links are active and the remaining N/2 links are inactive. The transmission of a symbol by the selection of which links will be active is denoted herein as beam index modulation. It will be appreciated that any suitable MCS may be used for the active links such that each would receive its own input data stream as shown for system 300 but the following discussion will address a beam index modulation embodiment using on-off keying without loss of generality. In particular, the transmitter and receiver complexity may be markedly increased if each active link is transmitting information independently of the information transmitted by the selection of the active links. If beam index modulation is used with OOK, note that there is no independent data stream to each active link. In an active-high embodiment, each active link receives a binary one input whereas each inactive link receives a binary zero input.

Figure 5:
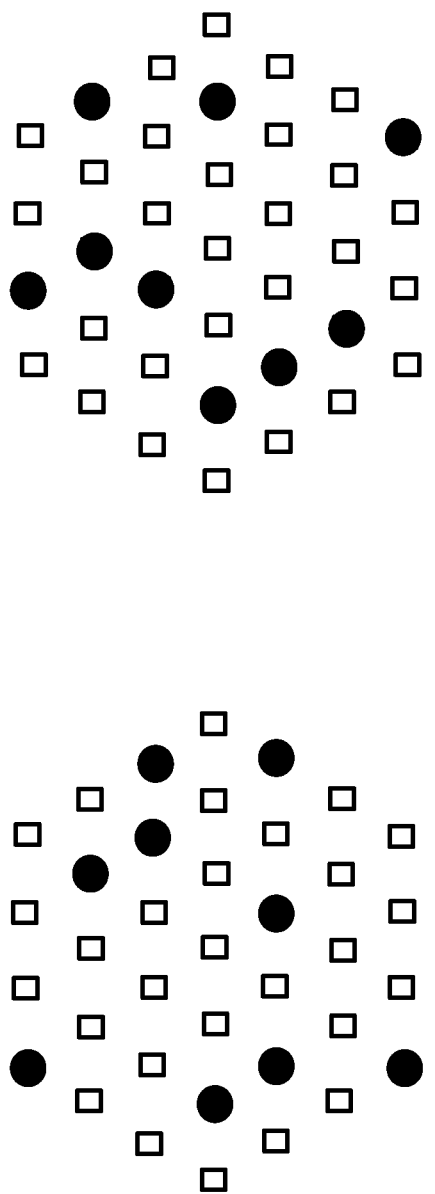
FIG. 5 illustrates the active and inactive antenna locations for two symbols in a lens antenna array embodiment with beam index modulation in which the active links equal one-fourth of the potentially-active links in accordance with an aspect of the disclosure.
Figure 6:
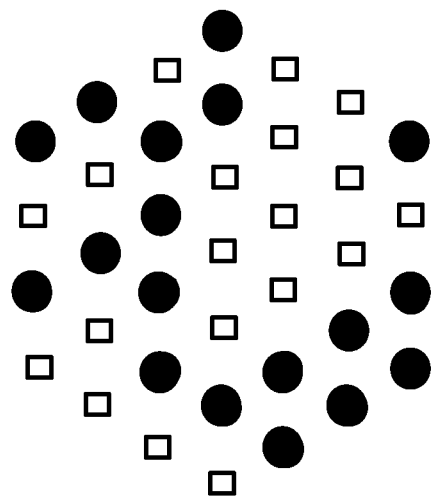
FIG. 6 illustrates the active and inactive antenna locations for two symbols in a lens antenna array embodiment with beam index modulation in which the active links equal one-half of the potentially-active links in accordance with an aspect of the disclosure.
Figure 6:
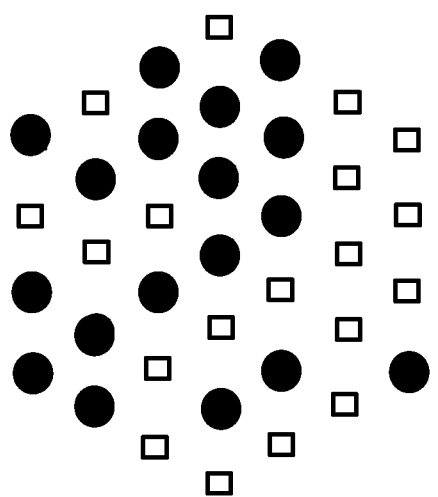

The number of possible symbols for a selection of K active links from the N possible links is given by the binomial coefficient of K and N and is equal to N!/(K!*(N−K)!). The information per symbol for beam index modulation is $\log_2$ (N!/(K! *(N−K)!)). The resulting number of possible symbols (and hence the greatest possible information transmitted per symbol) is maximized if K is N/2. In particular, it may be shown that the number of bits per symbol approaches N as N is increased. For lens antenna array systems with a relatively large number of antennas, it is thus nearly as efficient to transmit N bits using beam index modulation as compared to driving the N possible links independently. To reduce system complexity, the alphabet of possible symbols may be reduced to result in grid-like pattern in the antenna array as defined by the active vs in-active antennas. A pair of example symbols for an embodiment in which K is N/4 and N equals 37 is shown in FIG. 5. The active antennas are shown by darkened circles. A pair of example symbols for an embodiment in which K is N/2 and N equals 37 is shown in FIG. 6. Although an embodiment in which K is just N/4 results in less information per symbol, note that the symbols may be more easily distinguished. In contrast, an embodiment in which K is N/2 provides more information per symbol but the symbols may be less easily distinguishable from one another.

Note that as K is increased to be greater than N/2 the bits per symbol begins to decrease. For example, the total number of symbols (the alphabet size) is the same for K=1 and N−1. Similarly, the total number of symbols is the same for K=2 and N−2, and so on. Increasing the active symbols over K/2 thus consumes more power but does not provide extra information per symbol. In addition, the increase in the number of active links over N/2 increases the resulting interference between links.

Figure 7:
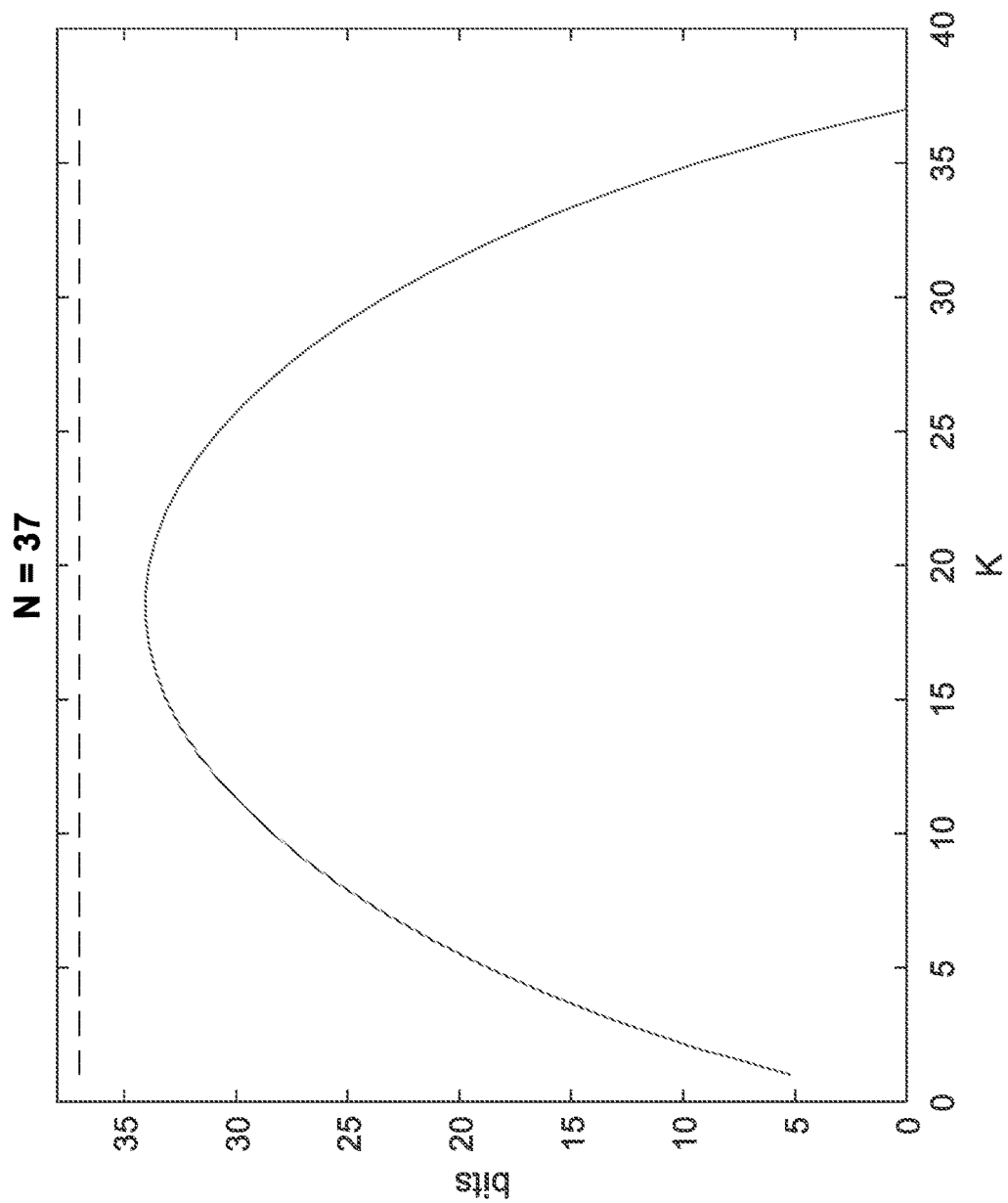
FIG. 7 is a graph of the bits for a symbol of a lens antenna array embodiment with a variable length code for beam index modulation in accordance with an aspect of the disclosure.

In some embodiments, the beam index modulation may use a variable length code in terms of the selection of the active K links. For example, in one embodiment K could range from 0 to N (note that zero active links is an identifiable symbol). The resulting information per symbol for a variable length code as the length K is varied is shown in FIG. 7 for a lens antenna array system with 37 transmit and receive antennas. At relatively-low values of K, the number of bits per symbol is reduced but the received signal fidelity is increased due to the reduction in interference between the active links. As K is increased to N/2, the number of bits per symbol reaches 34. If all 37 links were independently driven with their own data streams in an OOK embodiment, the number of bits per symbol interval would be 37. It may thus be appreciated that using beam index modulation with K=N/2 at such a relatively large N of 37 provides substantially the same number of bits per symbol interval as the use of N independent OOK-modulated links. As K increases beyond N/2, the bits per symbol decreases. The received signal fidelity will also typically drop as K is increased past N/2 due to the increased likelihood of interference.

With regard to the selection of active links, note that each endpoint may function as both a transmitter and a receiver according to one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full-duplex channel generally relies on physical isolation of a transmitter and receiver, and suitable interference cancellation technologies. Full-duplex emulation is frequently implemented for wireless links by utilizing frequency-division duplex (FDD) or time-division duplex (TDD). In FDD, transmissions in different directions operate at different carrier frequencies. In TDD, transmissions in different directions on a given channel are separated from one another using time division multiplexing. That is, at one time the channel is dedicated for transmission in one direction, while at other times the channel is dedicated for transmission in the other direction, where the direction may change periodically or aperiodically.

Figure 8:
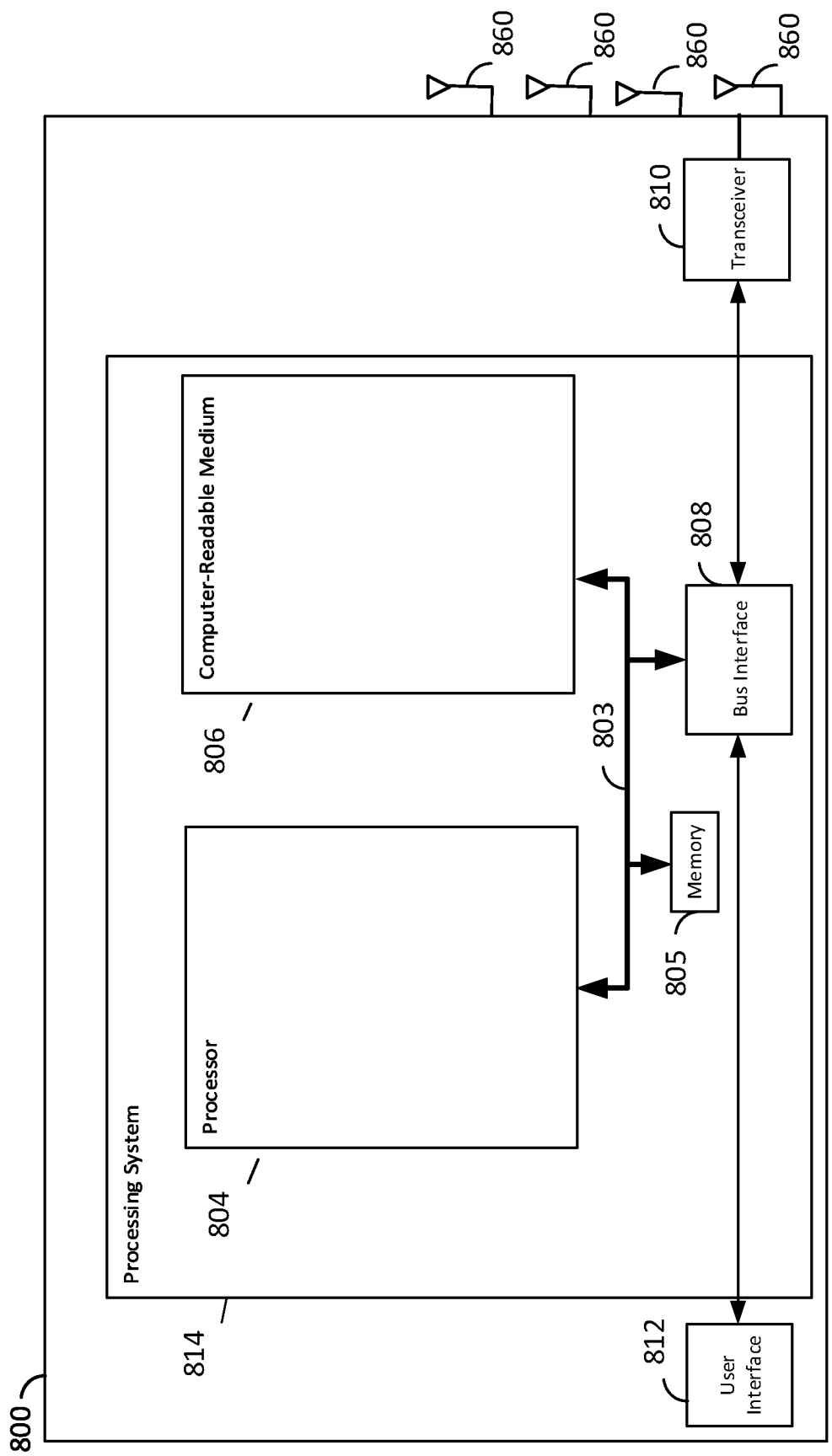
FIG. 8 illustrates an example network node for a lens antenna array with beam index modulation in accordance with an aspect of the disclosure.

An example endpoint 800 for a lens antenna array system is shown in FIG. 8. For illustration clarity, the associated lens for endpoint 800 is not shown in FIG. 8. Endpoint 800 may also be denoted as a network node. In operation, the point-to-point communication between a pair of network nodes 800 may be deemed to be between an access point network node and a user terminal network node. Network node 800 is generic to either an access point or a user terminal. Network node 800 includes a processing system 814 having a bus interface 808, a bus 802, a memory 805, a processor 804, and a computer-readable medium 806. Furthermore, node 800 may include a user interface 812 and a transceiver 810. Transceiver 810 transmits and receives through an array of antennas 860 as discussed previously with regard to lens antenna array transmitter 101 and lens antenna array receiver 102.

Processor 804 is also responsible for managing the bus 802 and general processing, including the execution of software stored on the computer-readable medium 806. The software, when executed by the processor 804, causes the processing system 814 to perform the beam-index-modulated communication disclosed herein. The computer-readable medium 806 and the memory 805 may also be used for storing data that is manipulated by the processor 804 when executing software.

The bus 802 may include any number of interconnecting buses and bridges depending on the specific application of the processing system 814 and the overall design constraints. The bus 802 communicatively couples together various circuits including one or more processors (represented generally by the processor 804), the memory 805, and computer-readable media (represented generally by the computer-readable medium 806). The bus 802 may also link various other circuits such as timing sources, peripherals, voltage regulators, and power management circuits, which are well known in the art, and therefore, will not be described any further. The bus interface 808 provides an interface between the bus 802 and the transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

Figure 9:
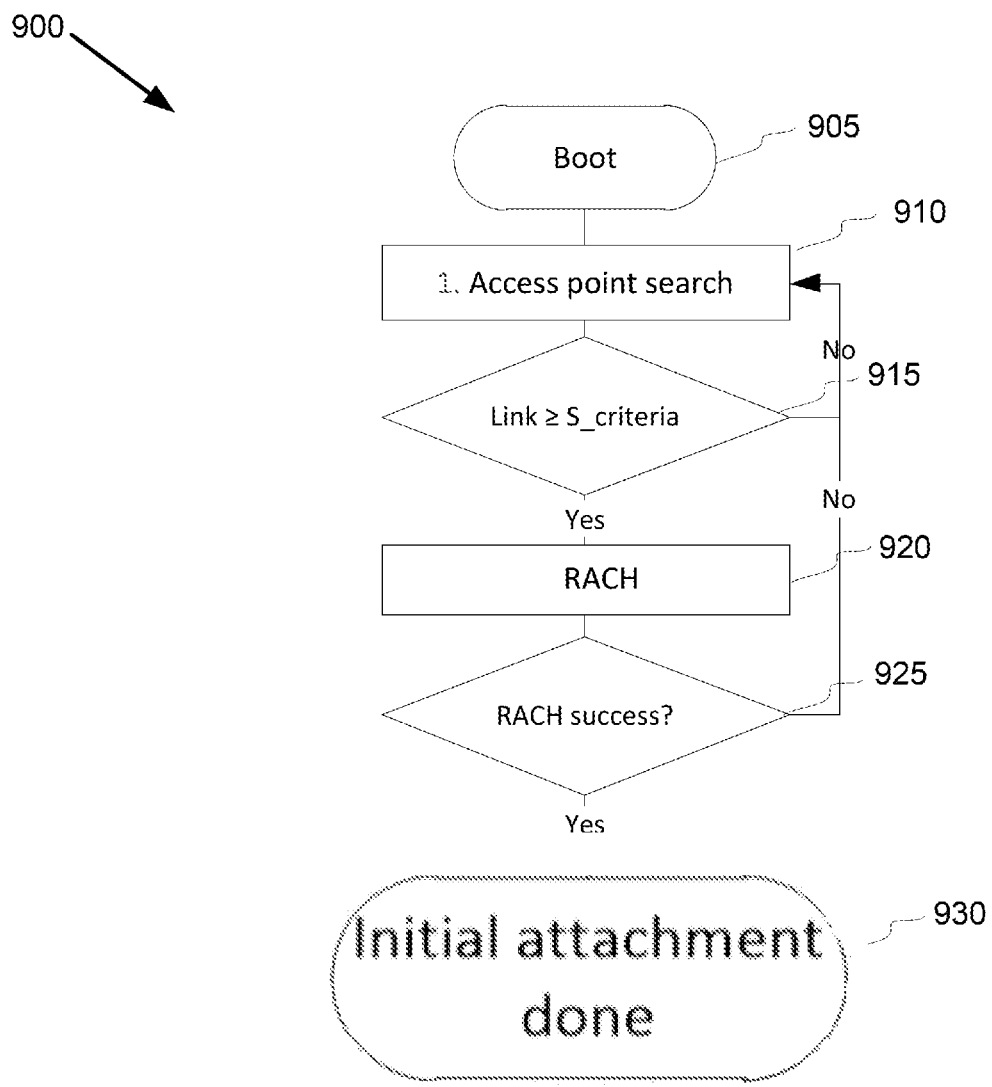
FIG. 9 illustrates a flowchart for an initialization method for a lens antenna array with beam index modulation in accordance with an aspect of the disclosure.

Processor 804 manages the establishment of each communication link and a subsequent beam index modulation. Referring again to system 300, processor 804 may implement link selector 330 in some embodiments. A flowchart for a method 900 of an initial establishment and optimization of the communication links as practiced by processor 804 is shown in FIG. 9. Method 900 occurs between an access point and a user terminal. As defined herein, an access point is the network node 800 that initiates the communication links. A user terminal is the network node 800 that responds to the initiation of the communication links. After a boot-up of each processor 804 in the two endpoints in a step 905, processor 804 in the access point initiates a search for the user terminal in a step 910. Prior to this search, processor 804 selects the desired number of communication links to be established. Each link may be implemented by a one-to-one mapping of a transmitting antenna to a receiving antenna. More generally, each link may be implemented by a mapping of a sub-array of transmit antennas to a corresponding sub-array of receive antennas. In general, the number of links is limited by the number of transmit antennas that may be driven with a corresponding data stream. Depending upon the implementation, processor 804 may select some or all of the transmit antennas. With the transmit antennas selected, the access point proceeds to test each link. Such a testing may be performed as shown in FIGS. 1A-1C. For example, in FIG. 1A, it is central transmit antenna 110 that is activated. If the antenna lens array receiver 103 is properly aligned with central axis 121, the transmitted RF signal 145 would be focused primarily onto central receive antenna 135. But a misalignment of antenna lens array receiver 103 (in this example, the user terminal) may result in a focusing of the transmitted RF signal 145 onto a different receive antenna. The transmit antenna(s) for each communication link may thus be sequentially (or simultaneously) activated and the resulting focusing onto the receive antennas observed. Processor 804 in the user terminal may thus identify which receive antennas are being targeted by which communication link as determined by whether the corresponding received RF signal for the communication link satisfies a link threshold (S_criteria) in a step 915. For example, the link threshold may be a power threshold for the received RF signal. Alternatively, the link threshold may comprise a successful decoding of a message. In other embodiments, the link threshold may be a signal-to-noise ratio (SNR) threshold.

In general, the number of successful links depends upon the alignment between access point and the user terminal. The link threshold may thus be a minimum number of links that are acceptable. In other words, suppose that N links are desired but that some smaller number of links than N (e.g., N−X, where X is less than N) would also be acceptable. The link threshold could thus be that the number of successful links is greater than or equal to N−X.

After all the links have been scanned and the link threshold satisfied, the user terminal reports the identity of the successful links to the access points in a step 920. Since prior to initiation it is unknown which links will be successfully established, their identification in a step 920 may be analogized to a random access channel (RACH) message. If the RACH was deemed successful with regard to identifying the desired links in a step 925, initiation is completed. If, however, the RACH was not successful, the method returns to the access point search step 910. A connected state would follow a successful RACH step 925 in which the established links be beam index modulated.

In the connected state, processor 804 in a transmitting endpoint may map a digital word into a selection of links (and hence into a selection of a subset of the transmit antennas) based upon an alphabet. For example, referring again to FIG. 5, a first digital word maps according to the alphabet into the transmit antenna selection shown for the first symbol. The receiving endpoint detects a corresponding selection of receive antennas by detecting that the corresponding subset of the receive antennas received the RF signals from the transmitting endpoint. The receive endpoint may then decode the first digital word from the selection of the subset of the receive antennas.

In various implementations, the frequency band used by a lens antenna array as disclosed herein may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators. For example, the holder of a license for a portion of licensed spectrum may provide licensed shared access (LSA) to share that spectrum with other parties, e.g., with suitable licensee-determined conditions to gain access.

Some example aspects of the disclosure will now be summarized:

Aspect 1. A method of wireless communication for a lens antenna array system, comprising selecting a first subset of transmit antennas from an array of transmit antennas arranged in a focal region of a first lens; transmitting from each transmit antenna in the first subset of transmit antennas to form a plurality of first RF signals that are directed through the first lens toward a second lens for a first symbol interval; selecting a second subset of transmit antennas from the array of transmit antennas; and transmitting from each transmit antenna in the second subset of transmit antennas to form a plurality of second RF signals that are directed through the first lens towards the second lens for a second symbol interval.

Aspect 2. The method of wireless communication of aspect 1, wherein the first subset of transmit antennas contains a same number of transmit antennas as contained within the second subset of transmit antennas.

Aspect 3. The method of wireless communication of any of aspects 1-2, wherein the array of transmit antennas are arranged in the focal region of the first lens such that each transmit antenna corresponds to a unique angle-of-departure from the first lens, the method further comprising: focusing the plurality of first RF signals through the second lens onto a first subset of receive antennas from an array of receive antennas arranged in a focal region of the second lens during the first symbol interval, and focusing the plurality of second RF signals through the second lens onto a second subset of receive antennas from the array of receive antennas during the second symbol interval.

Aspect 4. The method of wireless communication of aspect 3, further comprising: detecting that the first subset of receive antennas received the plurality of first RF signals to decode a first symbol in a receiver coupled to the array of receive antennas; and detecting that the second subset of receive antennas received the plurality of second RF signals to decode a second symbol.

Aspect 5. The method of wireless communication of any of aspects 1-2, wherein the number of transmit antennas in both the first subset of transmit antennas and in the second subset of transmit antennas is less than one-half of a total number of transmit antennas in the array of transmit antennas.

Aspect 6. The method of wireless communication of any of aspects 1-2, wherein the number of transmit antennas in both the first subset of transmit antennas and in the second subset of transmit antennas is less than one-fourth of a total number of transmit antennas in the array of transmit antennas.

Aspect 7. The method of wireless communication of any of aspects 1-2, wherein the number of transmit antennas in both the first subset of transmit antennas and in the second subset of transmit antennas is equal to one-half of a total number of transmit antennas in the array of transmit antennas.

Aspect 8. The method of wireless communication of any of aspects 1-7, the method further comprising: maintaining inactive each transmit antenna in the array of transmit antennas that does not belong to the first subset of transmit antennas during the first symbol interval; and maintaining inactive each transmit antenna in the array of transmit antennas that does not belong to the second subset of transmit antennas during the second symbol interval.

Aspect 9. The method of wireless communication of aspects 1-8, wherein a frequency of the plurality of first RF signals and of the plurality of second RF signals is between 100 GHz and 300 GHz.

Aspect 10. The method of wireless communication of aspect 9, wherein a separation between the first lens and the second lens is such that the second lens is within a near-field region of the first lens.

Aspect 11. A method of wireless communication comprising: transmitting a first plurality of RF signals over a first symbol interval from a first subset of transmit antennas in an array of transmit antennas arranged in a focal region of a first lens in a lens antenna array system that includes an array of receive antennas arranged in a focal region of a second lens such that an RF transmission from each transmit antenna maps to a corresponding receive antenna, wherein each transmit antenna not included within the first subset of transmit antennas is unused during the first symbol interval; and receiving the first plurality of RF signals at a first subset of receive antennas in the array of receive antennas to receive a first symbol.

Aspect 12. The method of aspect 11, further comprising: transmitting a second plurality of RF signals over a second symbol interval from a second subset of transmit antennas in the array of transmit antennas while each transmit antenna not included within the second subset of transmit antennas is unused during the second symbol interval; and receiving the second plurality of RF signals at a second subset of receive antennas in the array of receive antennas to receive a second symbol.

Aspect 13. The method of aspect 12, wherein the first subset of transmit antennas contains a same number of transmit antennas as contained within the second subset of transmit antennas.

Aspect 14. The method of aspect 12, wherein the first subset of transmit antennas contains a different number of transmit antennas as contained within the second subset of transmit antennas.

Aspect 15. The method of any of aspects 12-14, wherein the number of transmit antennas in both the first subset of transmit antennas and in the second subset of transmit antennas is less than one-half of a total number of transmit antennas in the array of transmit antennas.

Aspect 16. The method of any of aspects 12-14, wherein the number of transmit antennas in both the first subset of transmit antennas and in the second subset of transmit antennas is less than one-fourth of a total number of transmit antennas in the array of transmit antennas.

Aspect 17. The method of aspects 12-14, wherein the number of transmit antennas in both the first subset of transmit antennas and in the second subset of transmit antennas is equal to one-half of a total number of transmit antennas in the array of transmit antennas.

Aspect 18. The method of aspect 12, further comprising: mapping a first digital word into a selection of the first subset of transmit antennas from the array of transmit antennas arranged in a focal region of a first lens; and decoding the first digital word responsive to the receiving of the first symbol.

Aspect 19. The method of aspect 18, further comprising: mapping a second digital word into a selection of the second subset of transmit antennas from the array of transmit antennas; and decoding the second digital word responsive to the receiving of the second symbol.

Aspect 20. The method of any of aspects 11-19, wherein a frequency of the plurality of first RF signals and of the plurality of second RF signals is between 100 GHz and 300 GHz.

Aspect 21. A system for wireless communication, comprising: a first lens; a plurality of transmit antennas arranged in a focal region of the first lens; a plurality of on-off keying modulators corresponding to the plurality of transmit antennas, each on-off keying modulator and corresponding transmit antenna forming a transmit link; and a processor configured to map a first digital word into a selection of a first subset of the transmit links such that each transmit link in the first subset of the transmit links transmits an RF signal and such that each transmit link that is not in the first subset of the transmit links does not transmit an RF signal.

Aspect 22. The system of aspect 21, further comprising an oscillator for driving each on-off keying modulator.

Aspect 23. The system of aspect 22, wherein the oscillator is a voltage-controlled oscillator.

Aspect 24. The system of any of aspects 21-23, wherein each on-off keying modulator includes a mixer and a power amplifier.

Aspect 25. The system of any of aspects 21-24, wherein the processor is further configured to map a second digital word into a selection of a second subset of the transmit links such that each transmit link in the second subset of the transmit links transmits an RF signal and such that each transmit link that is not in the second subset of transmit links does not transmit an RF signal.

Aspect 26. A system for wireless communication, comprising: a first lens; a plurality of receive antennas arranged in a focal region of the first lens; a plurality of low-noise amplifiers corresponding to the plurality of receive antennas; a plurality of envelope detectors corresponding to the plurality of receive antennas, each receive antenna and corresponding low-noise amplifier and corresponding envelope detector forming a corresponding receive link; and a processor configured to map a selection of a first subset of the receive links into a first digital word based upon which receive link receives a first RF signal.

Aspect 27. The system of aspect 26, wherein the processor is further configured to map a selection of a second subset of the receive links into a second digital word based upon which receive link receives a second RF signal.

Aspect 28. The system of any of aspects 26-28, wherein the first subset of the receive links is less than one-half of a total number of the receive links.

Aspect 29. The system of any of aspects 26-27, wherein the first subset of the receive links equals one-half of a total number of the receive links.

Aspect 30. The system of any of aspects 26-27, wherein the first subset of the receive links is less than one-fourth of a total number of the receive links.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions disclosed herein may be rearranged and/or combined into a single component, step, feature or function or embodied in several components, steps, or functions. Additional elements, components, steps, and/or functions may also be added without departing from novel features disclosed herein. The apparatus, devices, and/or components disclosed herein may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication for a lens antenna array system, comprising:
    selecting a first subset of transmit antennas from an array of transmit antennas arranged in a focal region of a first lens;
    transmitting from each transmit antenna in the first subset of transmit antennas to form a plurality of first RF signals that are directed through the first lens toward a second lens for a first symbol interval;
    selecting a second subset of transmit antennas from the array of transmit antennas; and
    transmitting from each transmit antenna in the second subset of transmit antennas to form a plurality of second RF signals that are directed through the first lens towards the second lens for a second symbol interval.

2. The method of wireless communication of claim 1, wherein the first subset of transmit antennas contains a same number of transmit antennas as contained within the second subset of transmit antennas.

3. The method of wireless communication of claim 2, wherein the number of transmit antennas in both the first subset of transmit antennas and in the second subset of transmit antennas is less than one-half of a total number of transmit antennas in the array of transmit antennas.

4. The method of wireless communication of claim 2, wherein the number of transmit antennas in both the first subset of transmit antennas and in the second subset of transmit antennas is less than one-fourth of a total number of transmit antennas in the array of transmit antennas.

5. The method of wireless communication of claim 2, wherein the number of transmit antennas in both the first subset of transmit antennas and in the second subset of transmit antennas is equal to one-half of a total number of transmit antennas in the array of transmit antennas.

6. The method of wireless communication of claim 1, wherein the array of transmit antennas are arranged in the focal region of the first lens such that each transmit antenna corresponds to a unique angle-of-departure from the first lens, the method further comprising:
    focusing the plurality of first RF signals through the second lens onto a first subset of receive antennas from an array of receive antennas arranged in a focal region of the second lens during the first symbol interval, and
    focusing the plurality of second RF signals through the second lens onto a second subset of receive antennas from the array of receive antennas during the second symbol interval.

7. The method of wireless communication of claim 6, further comprising:
    detecting that the first subset of receive antennas received the plurality of first RF signals to decode a first symbol in a receiver coupled to the array of receive antennas; and
    detecting that the second subset of receive antennas received the plurality of second RF signals to decode a second symbol.

8. The method of wireless communication of claim 6, wherein a frequency of the plurality of first RF signals and of the plurality of second RF signals is between 100 GHz and 300 GHz.

9. The method of wireless communication of claim 8, wherein a separation between the first lens and the second lens is such that the second lens is within a near-field region of the first lens.

10. The method of wireless communication of claim 1, the method further comprising:
    maintaining inactive each transmit antenna in the array of transmit antennas that does not belong to the first subset of transmit antennas during the first symbol interval; and
    maintaining inactive each transmit antenna in the array of transmit antennas that does not belong to the second subset of transmit antennas during the second symbol interval.

11. A lens antenna array system, comprising:
    an array of transmit antennas arranged in a focal region of a first lens;
    an array of receive antennas arranged in a focal region of a second lens; and
    one or more processors coupled with the array of transmit antennas and the array of receive antennas, wherein the one or more processors are configured to:
        select a first subset of transmit antennas from the array of transmit antennas;
        transmit through the first subset of transmit antennas to form a plurality of first RF signals that are directed through the first lens toward the second lens for a first symbol interval;
        select a second subset of transmit antennas from the array of transmit antennas; and
        transmit through the second subset of transmit antennas to form a plurality of second RF signals that are directed through the first lens towards the second lens for a second symbol interval.

12. The lens antenna array system of claim 11, wherein the first subset of transmit antennas contains a same number of transmit antennas as contained within the second subset of transmit antennas.

13. The lens antenna array system of claim 12, wherein the number of transmit antennas in both the first subset of transmit antennas and in the second subset of transmit antennas is less than one-half of a total number of transmit antennas in the array of transmit antennas.

14. The lens antenna array system of claim 12, wherein the number of transmit antennas in both the first subset of transmit antennas and in the second subset of transmit antennas is less than one-fourth of a total number of transmit antennas in the array of transmit antennas.

15. The lens antenna array system of claim 12, wherein the number of transmit antennas in both the first subset of transmit antennas and in the second subset of transmit antennas is equal to one-half of a total number of transmit antennas in the array of transmit antennas.

16. The lens antenna array system of claim 11, wherein the array of transmit antennas is arranged in the focal region of the first lens such that each transmit antenna corresponds to a unique angle-of-departure from the first lens, wherein the lens antenna array system is configured to:
focus the plurality of first RF signals through the second lens onto a first subset of receive antennas from the array of receive antennas during the first symbol interval, and
focus the plurality of second RF signals through the second lens onto a second subset of receive antennas from the array of receive antennas during the second symbol interval.

17. The lens antenna array system of claim 16, further comprising:
a receiver configured to:
detect that the first subset of receive antennas received the plurality of first RF signals to decode a first symbol in a receiver coupled to the array of receive antennas; and
detect that the second subset of receive antennas received the plurality of second RF signals to decode a second symbol.

18. The lens antenna array system of claim 16, wherein a frequency of the plurality of first RF signals and of the plurality of second RF signals is between 100 GHz and 300 GHz.

19. The lens antenna array system of claim 18, wherein a separation between the first lens and the second lens is such that the second lens is within a near-field region of the first lens.

20. The lens antenna array system of claim 11, wherein the one or more processors are further configured to control the transmitter to:
maintain inactive each transmit antenna in the array of transmit antennas that does not belong to the first subset of transmit antennas during the first symbol interval; and
maintain inactive each transmit antenna in the array of transmit antennas that does not belong to the second subset of transmit antennas during the second symbol interval.

* * * * *